United States Patent
Bedard et al.

(10) Patent No.: US 10,988,112 B2
(45) Date of Patent: Apr. 27, 2021

(54) DISTRIBUTED VEHICLE AUTHORIZED OPERATIONS

(71) Applicant: Ford Global Technologies, LLC, Dearborn, MI (US)

(72) Inventors: Robert D. Bedard, Allen Park, MI (US); Clifford Anthony Bailey, Canton, MI (US); Willie Ham, Farmington Hills, MI (US); Ali Hassani, Ann Arbor, MI (US); Michael Kruntovski, Beverly Hills, MI (US); Lauren Peng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/573,083

(22) Filed: Sep. 17, 2019

(65) Prior Publication Data

US 2021/0078533 A1  Mar. 18, 2021

(51) Int. Cl.
| | |
|---|---|
| *B60R 25/24* | (2013.01) |
| *G06F 13/42* | (2006.01) |
| *B60R 25/102* | (2013.01) |
| *G07C 9/00* | (2020.01) |
| *G07C 9/27* | (2020.01) |

(52) U.S. Cl.
CPC ............ *B60R 25/24* (2013.01); *B60R 25/102* (2013.01); *G06F 13/42* (2013.01); *G07C 9/27* (2020.01)

(58) Field of Classification Search
CPC ..... B60R 25/24; B60R 25/241; B60R 25/102; B60R 25/2018; B60R 2325/205; G07C 9/27; G07C 9/00571; G07C 2209/08; G06F 13/42; G06F 2212/173; G06F 21/31; G07F 17/0057; G06Q 20/3223; G06Q 20/3224; H04L 2209/38; H04L 9/0637
USPC ........... 340/5.61, 5.72, 5.42, 4.6, 4.61, 4.62, 340/426.36
See application file for complete search history.

(56) References Cited

U.S. PATENT DOCUMENTS

| | | |
|---|---|---|
| 6,023,688 A | 2/2000 | Ramachandran et al. |
| 9,783,162 B2 | 10/2017 | Hoyos et al. |
| 2011/0238476 A1 | 9/2011 | Carr et al. |
| 2012/0221470 A1 | 8/2012 | Lyon |
| 2015/0278820 A1* | 10/2015 | Meadows .......... G06Q 20/3821 705/64 |
| 2015/0371153 A1* | 12/2015 | Lohmeier ............ G06Q 40/025 705/5 |
| 2017/0169363 A1* | 6/2017 | Salmasi .................. H04W 4/21 |
| 2018/0053158 A1 | 2/2018 | White |
| 2018/0096121 A1* | 4/2018 | Goeringer ............... G06F 21/64 |
| 2018/0202822 A1* | 7/2018 | DeLizio .................. B60R 25/24 |
| 2019/0092279 A1* | 3/2019 | Jarvis ...................... G06F 21/31 |

(Continued)

*Primary Examiner* — Edwin C Holloway, III
(74) *Attorney, Agent, or Firm* — Brandon Hicks; Bejin Bieneman PLC

(57) ABSTRACT

A system includes a computer including a processor and a memory. The memory stores instructions executable by the processor to store an electronic ledger that specifies an authorized operation for an entity to perform for a vehicle, receive a request, including an entity identifier for an entity making the request, to perform a requested operation, query the electronic ledger to determine that the requested operation is the authorized operation, and actuate the vehicle based on the authorized operation. The electronic ledger is a distributed electronic ledger shared between at least the vehicle and the entity.

20 Claims, 4 Drawing Sheets

(56) References Cited

U.S. PATENT DOCUMENTS

| | | | |
|---|---|---|---|
| 2019/0220861 A1* | 7/2019 | Silver | G06Q 20/367 |
| 2019/0259093 A1* | 8/2019 | Turato | G06Q 30/0645 |
| 2019/0317677 A1* | 10/2019 | Tanaka | G07F 17/10 |
| 2019/0378352 A1* | 12/2019 | Dey | G07C 5/008 |
| 2020/0005559 A1* | 1/2020 | Grunbok, II | G07C 5/0808 |
| 2020/0058176 A1* | 2/2020 | Pratz | G07C 5/0841 |
| 2020/0233973 A1* | 7/2020 | Ahmed | G06F 21/6245 |

\* cited by examiner

DISTRIBUTED VEHICLE AUTHORIZED OPERATIONS

BACKGROUND

In order to provide access to different users, a vehicle access device, e.g., a key, a fob, etc., may be physically transferred between users. Additionally, access to a vehicle may be restricted for various users based on various conditions.

DETAILED DESCRIPTION

Figure 1A:
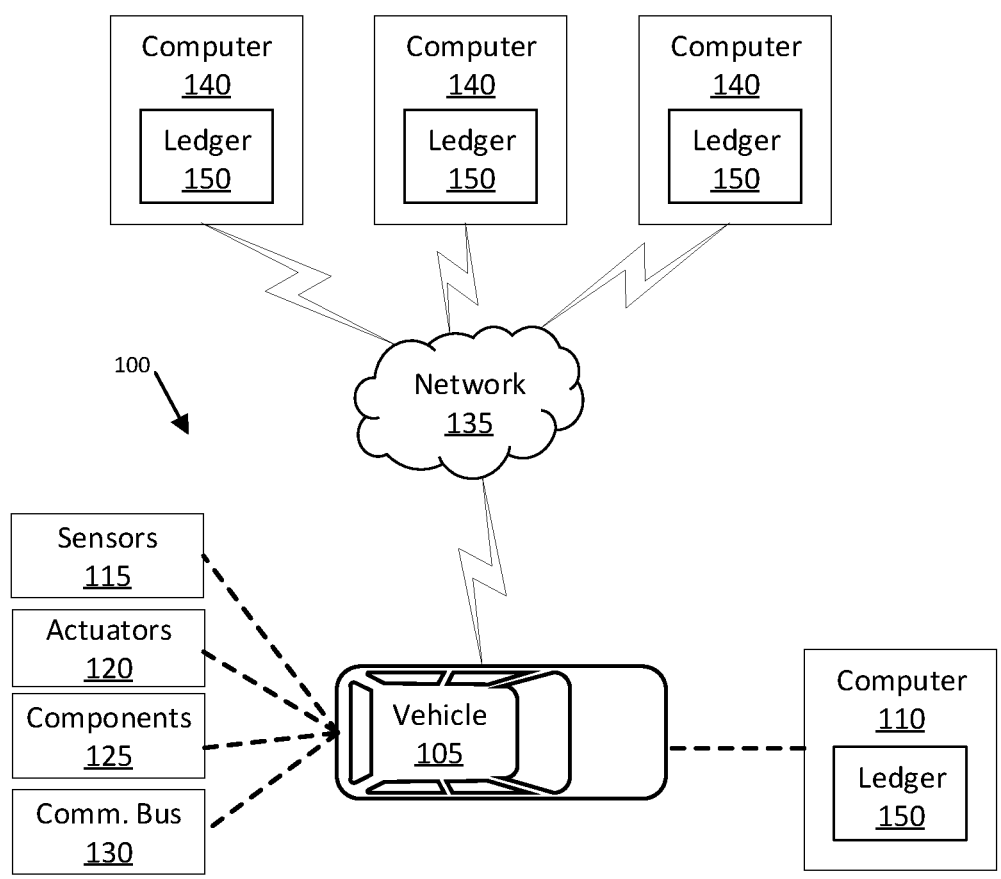
FIG. 1A is a block diagram illustrating an example system to authorize a requested operation for an entity to perform for a vehicle.

A system includes a computer including a processor and a memory, the memory storing instructions executable by the processor to store an electronic ledger that specifies an authorized operation for an entity to perform for a vehicle. The instructions further include instructions to receive a request, including an entity identifier for an entity making the request, to perform a requested operation. The instructions further include instructions to query the electronic ledger to determine that the requested operation is the authorized operation. The instructions further include instructions to actuate the vehicle based on the authorized operation. The electronic ledger is a distributed electronic ledger shared between at least the vehicle and the entity.

Actuating the vehicle includes operating the vehicle to a location of the entity.

The instructions can further include instructions to output a message to a user based the entity identifier.

The instructions can further include instructions to initiate the request based on a location of the vehicle.

The instructions can further include instructions to initiate the request based on data received from a device on a vehicle communications bus.

The instructions can further include instructions to record in the electronic ledger a record that a response to the request by the entity included the authorization and actuation of the vehicle to perform the authorized operation.

The instructions can further include instructions to determine that the requested operation is not authorized based on one or more prior operations recorded in the electronic ledger for the entity.

The instructions can further include instructions to determine that the authorized operation is not authorized based on the requested operation not meeting one or more parameters stored in the electronic ledger.

The system includes a master device. Determining that the requested operation is the authorized operation comprises querying the master device storing the electronic ledger in addition to a vehicle computer and an entity computer.

The system includes a master device. The instructions can further include instructions to receive the authorized operation for the entity from the master device and store the authorized operation for the entity to the electronic ledger.

A method includes storing an electronic ledger that specifies an authorized operation for an entity to perform for a vehicle. The method further includes receiving a request, including an entity identifier for an entity making the request, to perform a requested operation. The method further includes querying the electronic ledger to determine that the requested operation is the authorized operation. The method further includes actuating the vehicle based on the authorized operation. The electronic ledger is a distributed electronic ledger shared between at least the vehicle and the entity.

Actuating the vehicle includes operating the vehicle to a location of the entity.

The method can further include outputting a message to a user based the entity identifier.

The method can further include initiating the request based on a location of the vehicle.

The method can further include initiating the request based on data received from a device on a vehicle communications bus.

The method can further include recording in the electronic ledger a record that a response to the request by the entity included the authorization and actuation of the vehicle to perform the authorized operation.

The method can further include determining that the requested operation is not authorized based on one or more prior operations recorded in the electronic ledger for the entity.

The method can further include determining that the authorized operation is not authorized based on the requested operation not meeting one or more parameters stored in the electronic ledger.

Determining that the requested operation is the authorized operation comprises querying a master device storing the electronic ledger in addition to a vehicle computer and an entity computer.

The method can further include receiving the authorized operation for the entity from a master device and storing the authorized operation for the entity to the electronic ledger.

Further disclosed herein is a computing device programmed to execute any of the above method steps. Yet further disclosed herein is a computer program product, including a computer readable medium storing instructions executable by a computer processor, to execute an of the above method steps.

A plurality of computers 110, 140 generate and maintain a blockchain ledger 150 for managing authorized operations of a vehicle 105. Each of the plurality of computers 110, 140 is communicatively coupled in a blockchain network 111. For example, the computers 110, 140 may be included in computing devices 140 external to the vehicle 105 and a vehicle computer 110. The blockchain network 111 includes distributed computers 110, 140 as a peer-to-peer network or a peer-to-peer network with a supervisory computer. The computers 110, 140 authorized to participate in the blockchain network 111 are listed in the blockchain ledger 150.

In this disclosure, the term "network" in the context of a blockchain network 111 means a network formed by computers 110, 140, i.e., a blockchain network 111 means the computers 110, 140 that form the blockchain, including links to each other computers 110, 140. On the other hand, a "network" in the context of devices communicating with each other, e.g., ECUs and/or devices communicating via a vehicle network and/or wide area network 135, means a physical wired and/or wireless network comprising conventional networking hardware, media, protocols, etc.

Each computer 110, 140 may include programming to provide a proof of work for participating as a computer in a blockchain maintenance group. A proof of work is one example of a consensus algorithm, which is used to achieve agreement on data shared among multiple entities. A proof of work is a requirement that a computation, typically requiring extensive computational resources (i.e., significant processing power and/or significant processing time), be performed as a prerequisite to proceeding with a computational task, e.g., performing a transaction (e.g., adding a block to a blockchain ledger). As an example, a proof of work may be a requirement to identify a number that, when added to a block of data, modifies the data such that a hash of the data has a specific quality, such as a number of leading zeros. Providing proof of work may include responding to a request from the blockchain maintenance group. The request may include, for example, a data block to be modified, a hash function to be used to generate the hash of the data block and the specific result required from the proof of work. Additionally, or alternatively, performing proof of work may include solving other types of digital puzzles requiring extensive computational resources.

Authorized operations for an entity to perform for the vehicle 105 can be stored as data blocks in the blockchain ledger 150. The blockchain ledger 150 is one example of an electronic ledger. An electronic ledger is a distributed database. "Distributed" in this context means that copies of the database are maintained by multiple entities with access to the electronic ledger, e.g., to verify data on the ledger, to store data to the ledger, etc. Authorized operations for an entity are specified by a vehicle 105 owner. The authorized operations for an entity may further specify one or more parameters. Non-limiting examples of parameters include a location of the entity, a timeframe, sensor data, a token threshold (as described below), a route, etc. For example, the vehicle 105 owner may specify an entity, e.g., a user, may access the vehicle during a specific timeframe, e.g., between 9 a.m. and 5 p.m. As another example, the vehicle 105 owner may authorize the vehicle 105 to travel to locations of specific entities, e.g., during specific timeframes. As yet another example, the vehicle 105 owner may specify authorized routes the entity, e.g., a user, may operate the vehicle 105, e.g., prohibiting operation of the vehicle 105 on freeways by the entity. The data blocks stored within the blockchain ledger 150 are linked in chains by hashes.

A blockchain ledger 150 is an electronic ledger maintained in each of a plurality of the computers 110, 140 that form the blockchain network 111, each storing shared data based on generation of hashes for blocks of data. A hash in the present context is a one-way encryption of data, i.e., a result of executing a hash function, having a fixed number of bits. An example of hash encryption is SHA-256. The hashes, i.e., results of hash functions, provide links to blocks of data by identifying locations of the block of data in storage (digital memory), for example by use of an association table mapping hashes to respective storage locations. An association table provides a mechanism for associating the hash (which may also be referred to as a hash key) with an address specifying a physical storage device either in a vehicle or a stationary location. The hash for the block of data further provides a code to verify the data to which the hash links. Upon retrieving the block of data, a computer can recompute the hash of the block of data and compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key. An example structure of a blockchain ledger 150 is discussed below in reference to FIG. 2.

FIG. 1 is a block diagram of an example system 100 that includes an instance of a blockchain ledger 150 hosted on at least one computing device 140 and a vehicle computer 110. The computers 110, 140 are programmed to store an electronic ledger, e.g., a blockchain ledger 150, that specifies an authorized operation for an entity to perform for the vehicle 105. The computers 110, 140 are further programmed to receive a request, including an entity identifier for an entity making the request, to perform a requested operation. The computers 110, 140 are further programmed to query the electronic ledger, e.g., the blockchain ledger 150, to determine that the requested operation is the authorized operation, and actuate the vehicle 105 based on the authorized operation. The electronic ledger is a distributed electronic ledger shared between at least the vehicle 105 and the entity.

Vehicle computers 110 may be communicatively coupled to one or more computing devices 140 external to the vehicle computer 110, e.g., via a network 135. The one or more computing devices 140 may request the vehicle computer 110 to perform an operation, and the vehicle computer 110 may perform the operation with authorization, e.g., from a user. In these circumstances, users may alter settings and/or preferences stored in a memory of the vehicle computer 110 to authorize unauthorized operations. Advantageously, the electronic ledger provides authorized operations to the vehicle computer 110 that cannot be altered by users in the vehicle 105, which prevents individual users tampering with the settings and/or preferences stored in a memory of the vehicle computer 110 to authorize unauthorized operations.

The vehicle 105 includes a vehicle computer 110, sensors 115, actuators 120, vehicle components 125, and a vehicle communications bus 130. Via a network 135, the communications bus 130 allows the vehicle computer 110 to communicate with other computing devices 140.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle communications network 135 such as a communications bus 130 as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle communications network 135, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network 135 may be used for communications between devices represented as the vehicle computer 110 in this disclosure. Further, as mentioned below, various controllers and/or sensors 115 may provide data to the vehicle computer 110 via the vehicle communications network 135.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the vehicle computer 110 may be configured for communicating via a vehicle-to-vehicle communication bus 130 or interface with devices outside of the vehicle 105, e.g., through a vehicle-to-vehicle (V2V) or vehicle-to-infrastructure (V2X) wireless communications to another vehicle, and/or to other computers 140 (typically via direct radio frequency communications). The communications bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications bus 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote devices, including the computers 140 external to the vehicle 105. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 1B:
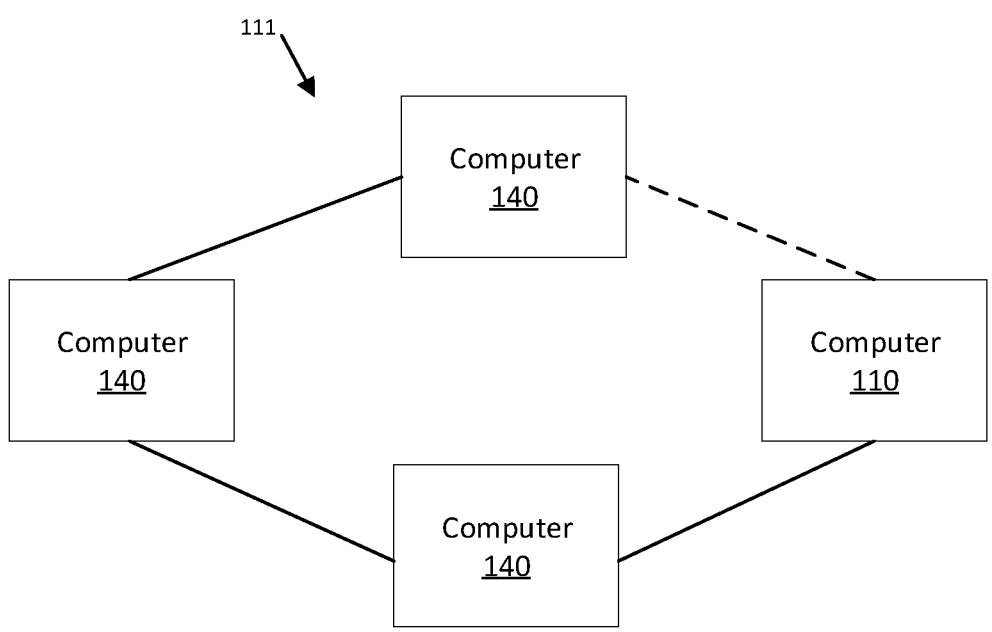
FIG. 1B is a block diagram illustrating an example blockchain network.

The blockchain network 111 (as shown in FIG. 1B) includes the plurality of computers 110, 140, i.e., in a peer-to-peer network, with each computer 110, 140 in the peer-to-peer network including links to other computers 110, 140 in the blockchain network 111. Computers 110, 140 in the blockchain network 111 may be specified by, e.g., the vehicle 105 owner, the vehicle 105 manufacturer, etc., and may be recorded in the blockchain ledger 150.

The blockchain ledger 150 is a distributed blockchain ledger. That is, each computer 110, 140 stores, e.g., in a memory, one copy of the blockchain ledger 150. The computers 110, 140 may, for example, receive data blocks from other computers 110, 140 and may upload the data blocks to their respective copies of the blockchain ledger 150, i.e., store the respective data blocks in respective storage locations in their respective blockchain ledgers 150 such that each data block is linked to one respective previous data block. Each data block may specify authorized operations for an entity to perform for the vehicle 105. In the present context, an "entity" is a user or users other than the vehicle 105 owner that requests, e.g., via a computing device 140, to perform an operation for the vehicle 105. The data blocks may be generated based on requests, which may be submitted, for example, by a computer 140 maintained by the entity, e.g., the entity computer. Each computer 110, 140 can compare its stored blockchain data, i.e., linked data blocks, to versions of the blockchain ledger 150 stored by other computers 110, 140 to verify the data blocks. For example, each computer 110, 140 can generate a hash based on the data stored in a respective data block of a blockchain stored by another computer 110, 140. In the case the hash generated by the one computer 110, 140 matches the hash stored by the other computers 110, 140 for the respective data block, the one computer 110, 140 determines the data block is verified.

The plurality of computers 110, 140 maintains the blockchain ledger 150. That is, the plurality of computers 110, 140 may receive requests from time-to-time to add a computer to the plurality of computers 110, 140. The computer may be, for example, a computer hosted on a computing device 140 external to the vehicle 105, e.g., maintained by an entity. In the present context, "external to the vehicle 105" means that the computer device 140 is not installed on the vehicle 105. That is, the vehicle 105 can move separately from the computing device 140. The computers in the plurality of computers 110, 140 evaluate the request, as described below. In case that the request is approved, the plurality of computers 110, 140 adds the computer to the plurality of computers 110, 140 and adds a data block to the blockchain ledger 150 recording the addition.

Additionally, or alternatively, the plurality of computers 110, 140 may receive requests for one entity to perform a requested operation for the vehicle 105. The computers 110, 140 evaluate the request, as described below. In the case that the request is approved, the plurality of computers 110, 140 adds a data block to the blockchain ledger 150 recording the authorization.

Each computer 110, 140 stores one copy of the blockchain ledger 150. The computers 110, 140 can be accessed via the communications network 135. The computers 110, 140 may be associated with an entity that participates in maintaining the blockchain ledger 150, e.g., to verify data in the blockchain ledger 150, to store data on the blockchain ledger 150, etc. For example, a computer 110, 140 may be hosted on the vehicle computer 110 and computing devices 140 external to the vehicle 105.

The computing devices 140 external to the vehicle 105 can include a master device and one or more entity computers. A master device is a computing device including a processor and a memory as are known. The master device may be maintained by, e.g., the vehicle 105 owner. For example, the master device may be a portable device. A portable device can be any one of a variety of computers that can be used while carried by a person, e.g., a smartphone, a tablet, a personal digital assistant, a smart watch, etc. The master device stores a copy of the blockchain ledger 150. The master device may include an identifier that identifies the master device. In this context, an "identifier" is an alphanumeric string of data that corresponds to the master device. That is, the identifier identifies the specific master device.

The master device is programmed to provide authorized operations to the blockchain ledger 150. For example, the master device may receive input from the vehicle 105 owner, e.g., via an interface, indicating the authorized operation for an entity. The master device can then transmit the authorized operation for the entity and the identifier of the master device to the other computers 110, 140. Upon receiving the transmission, the plurality of computers 110, 140 evaluate the transmission based on the identifier. For example, the blockchain ledger 150 may store an authorized identifier that specifies a device authorized to provide authorized operations for an entity. In the case the identifier of the master device matches the authorized identifier stored in the blockchain ledger 150, the plurality of computers 110, 140 authorize the transmission and store the authorized operation for the entity to the blockchain ledger 150.

The entity computer is a computing device including a processor and a memory. The entity computer is maintained by the entity. As one example, the entity computer may be a portable device. A portable device can be any one of a variety of computers that can be used while carried by a person, e.g., a smartphone, a tablet, a personal digital assistant, a smart watch, etc. As another example, the entity computer may be maintained at a location of the entity. The entity computer stores a copy of the blockchain ledger 150. The entity computer may include the entity identifier that identifies the entity. In this context, an "entity identifier" is an alphanumeric string of data that corresponds to the entity. That is, the entity identifier identifies the specific entity.

The entity computer may be programmed to initiate a request to perform an operation for the vehicle 105. An operation is a mechanical, electrical, or electro-mechanical function that is performed by the vehicle computer 110 and/or vehicle components 125. Non-limiting examples of requested operations include allowing a user to access the vehicle 105, guiding and/or operating the vehicle 105 to a location within a timeframe, transferring tokens (as described below) to the entity computer, etc.

The entity computer may initiate the request based on one or more parameters. For example, the entity computer may initiate a request based on a location of the vehicle 105. For example, the entity computer may be programmed to initiate a request when the vehicle 105 is within a distance threshold of the entity computer. The distance threshold may be a maximum distance within which the entity computer can communicate with the vehicle computer 110. The distance threshold may be determined by empirical testing to determine the maximum distance that the entity computer can communicate with the vehicle computer 110 or specified by the vehicle 105 owner.

Additionally, or alternatively, the entity computer may initiate a request based on data received from a device, e.g., sensors 115, a server, a remote computer, etc., on a vehicle communications bus 130. For example, the entity computer may initiate a request based on sensor 115 data from one or more sensors 115 indicating, e.g., a fuel level, an oil level, a tire pressure, etc., of the vehicle 105. As another example, the entity computer may initiate a request based on data received from a server, e.g., traffic data, weather data, etc.

The vehicle computer 110 stores a copy of the blockchain ledger 150. The vehicle computer 110 is programmed to receive, e.g., via the network 135, a request from other computers 140, e.g., entity computers and/or the master device.

The vehicle computer 110 may be programmed to output a message to a user of the vehicle 105 based on the request and the entity identifier. For example, the message may indicate e.g., that the computers 110, 140 rejected or authorized the requested operation (as described below), the vehicle computer 110 is performing an authorized operation based on the request, a location of an entity and corresponding authorized operations for the entity, information provided by the entity computer such as a time to arrive at the location of the entity, completion of services by the entity, etc. The message may be, e.g., displayed on a display in the vehicle 105 and/or output via speakers of the vehicle 105.

The vehicle computer 110 can be programmed to actuate the vehicle 105 to perform the authorized operation upon the computers 110, 140 determining the requested operation is an authorized operation (as described below). For example, the vehicle computer 110 is programmed to actuate one or more vehicle components 125 based on the authorized operation. For example, the vehicle computer 110 may be programmed to actuate one or more locks of the vehicle 105 to provide or deny physical access to the vehicle 105 to the entity. As another example, the vehicle computer 110 may be programmed to actuate one or more of a brake, a propulsion, and a steering to operate the vehicle 105, e.g., to the location of the entity. In this situation, the vehicle computer 110 may operate the vehicle 105 to arrive at the location of the entity within a timeframe, e.g., business hours, an appointment time, etc. As yet another example, the vehicle computer 110 may be programmed to actuate a navigation system to guide the vehicle 105, e.g., along an authorized route, to a location of the entity, etc.

The vehicle computer 110 can be programmed to record in the blockchain ledger 150 a record indicating a response to the request by the entity upon performing the authorized operation. The response may include data indicating the authorization and actuation of the vehicle 105 to perform the authorized operation. For example, the response may indicate completion of the authorized operation. Additionally, or alternatively, the response may include data indicating a transfer of tokens from the vehicle computer 110 to the entity computer. In the present context, a "token" is data that represents a number of units of an object and is transferrable on the blockchain. The unit can be, for example, a unit of currency money, e.g., 0.01 cents, 0.1 cents, 1 cent, a unit of virtual currency (or faction thereof), etc., an amount of an object, e.g., size or weight, of a raw material object, e.g., 1 gram of gold or silver, 1 foot of lumber, etc. The vehicle computer 110 can store, e.g., in a memory, the tokens and can transmit the tokens to one or more computers 140.

For example, the requested operation may include a request to transfer a number of tokens to the entity computer upon arrival at the location of the entity. In such an example, the vehicle computer 110 may programmed to authorize the requested transfer when the number of tokens requested is below a token threshold. The token threshold is a maximum number of tokens that are authorized to be transferred from the vehicle computer 110 to an entity computer. The token threshold is specified by the vehicle 105 owner, e.g., via the master device, for the entity and is stored in the blockchain ledger 150. Upon arrival at the entity location, the vehicle computer 110 may transfer the tokens to the entity computer and record the response to the request, i.e., the transfer of tokens, to the blockchain ledger 150.

The computers 110, 140 are programmed to vote to accept or reject the requested operation. The result of the vote may be based on a majority of the computers 110, 140 in the plurality of computers 110, 140, i.e., a consensus protocol. As one example, the result of the vote may be based on a weighted majority, i.e., a proof of stake, wherein each of the computers 110, 140 are assigned weights. Each computer 110, 140 may be allotted a vote with a predetermined weight (for example, stored in memory by the device manufacturer, or for aftermarket devices, stored in memory when the aftermarket device is added to the blockchain ledger 150). The weight may be predetermined, for example, based on the entity associated with the computer 110, 140. In such an example, a computing device 140 associated with the master device may have a higher predetermined weight than a computing device 140 associated with an entity computer. Alternatively, the result of the vote may be based on any suitable consensus algorithm, e.g., proof of burn, proof of elapsed time, proof of capacity, proof of activity, etc.

The computers 110, 140 may evaluate the request and determine whether to accept or reject the request, i.e., how to vote on the request. The computers 110, 140 perform the evaluation based on one or more criteria. A first criterion may be whether the requested operation matches an authorized operation stored in the blockchain ledger 150. For example, the computers 110, 140, e.g., the master device, the entity computer, and the vehicle computer 110, may query the respective copies of the blockchain ledger 150 to determine the requested operation is an authorized operation. For example, the computers 110, 140 may determine the requested operation is authorized based on the requested operation matching an authorized operation stored in each copy of the blockchain ledger 150, i.e., meeting each parameter of one authorized operation. Conversely, the computers 110, 140 may determine the requested operation is not authorized based on the requested operation not matching an authorized operation, i.e., not meeting one or more parameters stored in the blockchain ledger 150 for the entity.

As another example, the computers 110, 140 can determine the requested operation is not authorized based on one or more prior operations recorded in the blockchain ledger 150 for the entity. That is, the computers 110, 140 can compare prior operations to the requested operation and determine whether the requested operation is authorized based on the prior operations. For example, the computers 110, 140 may authorize requested reoccurring operations, i.e., similar or identical operations that occur on a repetitive basis. As another example, the computers 110, 140 may authorize requested operations that fall within the parameters of previously authorized operations.

Additionally, or alternatively, other criteria may be whether the entity computer 140 provided a correct proof of work. For example, in a case that the proof of work was to identify a number, that when added to a first data block, generates a second data block for which a hash function results in a hash with a specific quality, the computers 110, 140 may confirm the result. That is, the computers 110, 140 may add the number provided by the entity computer to the first data block to regenerate the second data block, and then apply the hash function to the second data block to determine that the resulting hash has the specific quality. In the case that the resulting hash has the specific quality, the computers 110, 140 will vote to accept the request.

Additionally, or alternatively, other criteria may be used to evaluate the request to determine whether to vote positively or negatively with respect to granting requested authorization. For example, a computer 110, 140 may maintain a list of identifiers of entity computers that can be authorized. The computers 110, 140 may require that an entity identifier be supplied by the entity computers requesting access that appears on the list of entity identifiers that can be authorized and only accept requests from entity computers that supply such an entity identifier. As another example, additionally or alternatively to supplying proof of work and/or an authorized entity identifier, the entity computer may be required to supply a digital key that matches or pairs with a digital key maintained by the computers 110, 140. In the case that the entity computer supplies the digital key, the computers 110, 140 may accept the request. In a case that one or more of the criteria for acceptance by the computers 110, 140 are not met, the computers 110, 140 will vote to reject the request.

Figure 2:
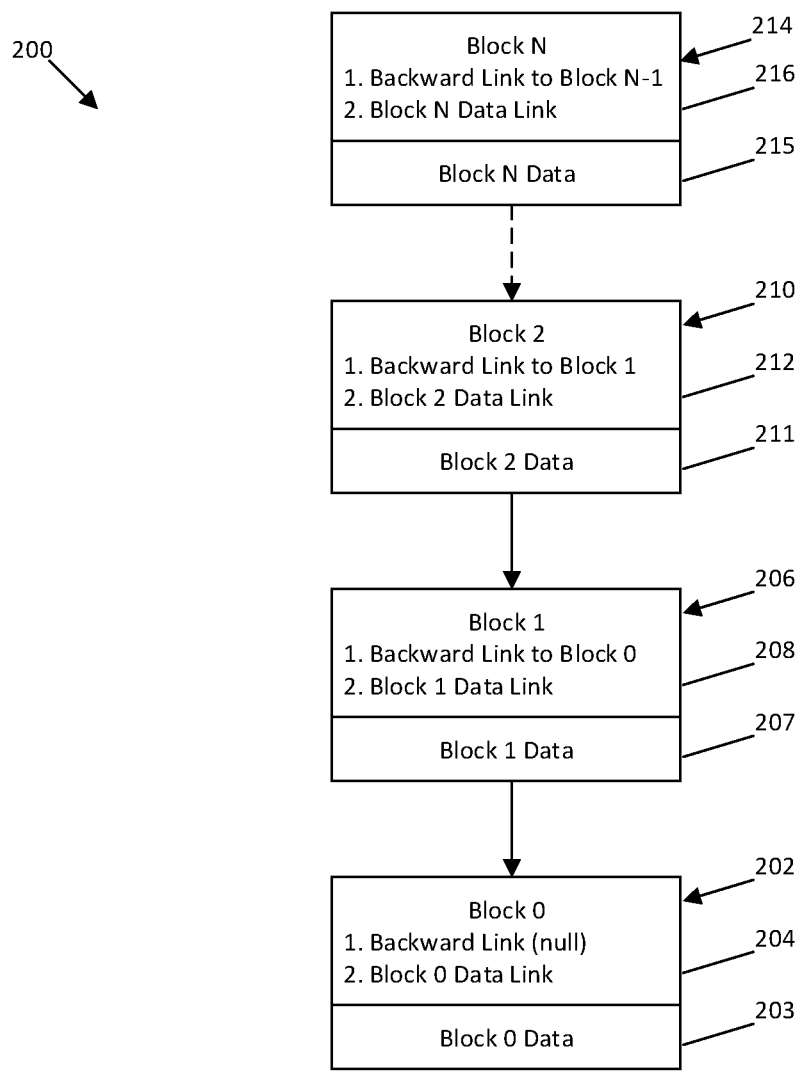
FIG. 2 is an example of a blockchain ledger.

FIG. 2 is an example of a blockchain 200 such as may be used for the blockchain ledger 150. The blockchain 200 includes a zero data block 202, a first data block 206, a second data block 210 and a nth data block 214. The blocks are organized in a chain. The zero data block 202 is at a first, beginning end of the chain. The first data block 206 is linked to the zero data block 202. The second data block 210 is linked to the first data block 206. Each successive data block is linked to the previous data block. The nth data block 214, at a second end of the chain, is linked to the (n−1)th data block (not shown).

Each block includes a data portion and a linking portion as shown in Table 1.

| Data Block | Data Portion | Linking Portion |
|---|---|---|
| 202 | 203 | 204 |
| 206 | 207 | 208 |
| 210 | 211 | 212 |
| 214 | 215 | 216 |

The data portion 203, 207, 211, 215 includes data to be stored in the data block. The linking portion 204, 208, 212, 216 includes a link to the data portion, and, except for the zero data block, includes a link to the previous data block in the chain. For example, in the first data block 206, the data portion 207 stores data. The linking portion 208 includes a link "block 1 data link" that provides a link to the data portion 207. The linking portion 208 further includes a link "backward link to block 0" that provides a link to the linking portion of data block 0.

Figure 3:
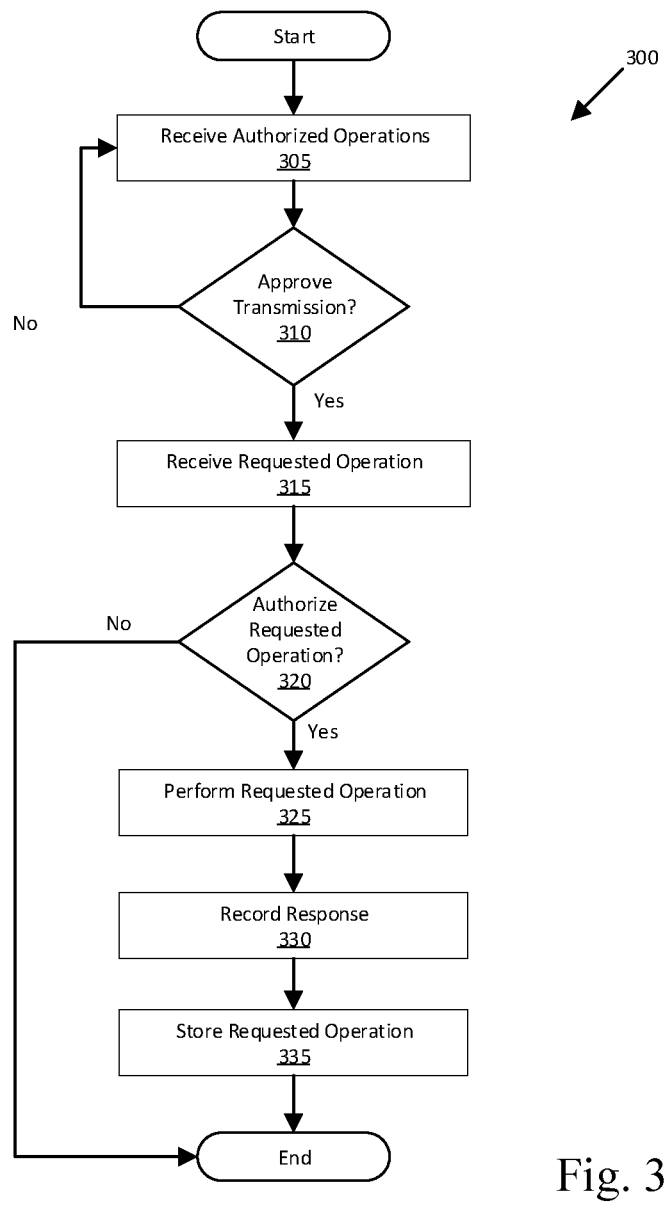
FIG. 3 is a flow diagram of an example process for authorizing a requested operation.

FIG. 3 is a diagram of an example process 300 for authorizing a request for an entity to perform an operation for a vehicle 105. The process 300 begins in a block 305.

In the block 305, the computers 110, 140 receive authorized operations for an entity from the master device. For example, the vehicle 105 owner can input the authorized operations into the master device, e.g., via an interface, and the master device can transmit data indicating the authorized operations to each computer 110, 140, e.g., via the blockchain network 111. Each authorized operation specifies the entity identifier and one or more parameters, as described above. The process 300 continues in a block 310.

In the block 310, the computers 110, 140 determine whether to approve the transmission specifying authorized operations. For example, in addition to the authorized operations, the master device may transmit the identifier of the master device, e.g., in a same or different transmission as the authorized operations. The blockchain ledger 150 may store an authorized identifier that specifies a device authorized to provide authorized operations. The computers 110, 140 may query the blockchain ledger 150 to determine whether the identifier of the master device matches the authorized identifier. In the case where the identifier of the master device matches the authorized identifier, the master device is authorized to provide authorized operations. Conversely, in the case in which the identifier of the master device does not match the authorized identifier, the master device is not authorized to provide authorized operations. In the case where the master device is authorized, the computers 110, 140 store the authorized operations to the blockchain ledger 150, and the process 300 continues in a block 315. Otherwise, the computers 110, 140 reject the authorized operations and the process 300 returns to the block 305.

In the block 315, the computers 110, 140 receive a request to perform a requested operation for the vehicle 105 from an entity, e.g., an entity computer 140. For example, the entity computer 140 can transmit a request to each computer 110, 140, e.g., via the blockchain network 111. The requested operation may be for, e.g., the vehicle 105 to provide access to a user, the vehicle 105 to operate to a location of the entity within a timeframe, the vehicle computer 110 to transfer tokens to the entity computer 140, etc. Each request includes the entity identifier for the entity and the request to perform the requested operation. The process 300 continues in a block 320.

In the block 320, the computers 110, 140 vote to authorize or reject the requested operation. For example, the computers 110, 140 may query the blockchain ledger 150 to determine whether the requested operation matches an authorized operation for the entity based on the entity identifier, as described above. In the case that the requested operation matches the authorized operation, the computers 110, 140 vote to authorize the requested operation. In the case that the requested operation does not match, i.e., does not meet one or more parameters of, the authorized operation, the computers 110, 140 vote to reject the requested operation. The vehicle computer 110 receives the votes from the computers 110, 140 and then determines whether the requested operation is authorized based on the number of votes authorizing the requested operation. The result of the vote may be determined according to e.g., a vote of a majority of the computers 110, 140, i.e., a consensus protocol, a weighted majority vote with each computer 110, 140 assigned a weight, i.e., a proof of stake, etc., as described above. In the case that the requested operation is authorized, the process 300 continues in a block 325. Otherwise, the process 300 ends.

In the block 325, the vehicle computer 110 is programmed to actuate the vehicle 105 upon the computers 110, 140 authorizing the requested operation. For example, the vehicle computer 110 may be programmed to perform the requested operation. That is, the vehicle computer 110 may be programmed to actuate one or more vehicle components 125 to perform the requested operation. For example, the vehicle computer 110 can actuate one or more vehicle components 125 to, e.g., allow a user to access the vehicle 105, operate and/or guide the vehicle 105 to a location of the entity, etc. The process 300 continues in a block 330.

In the block 330, upon performing the requested operation, the vehicle computer 110 records a response indicating authorization and actuation of the authorized operation. That is, the vehicle computer 110 verifies completion of the requested performance. The vehicle computer 110 can then transmit the response to the other computers 140. Additionally, or alternatively, the vehicle computer 110 can transfer one or more tokens to the entity computer 140, as described above. The process 300 continues in a block 335.

In the block 335, the blockchain ledger 150 is modified. Typically, each computer 110, 140 modifies the respective copy of the blockchain ledger 150 stored in the memory of the computers 110, 140. For example, each computer 110, 140 may add a data block to the respective copy of the blockchain ledger 150. The added data block can include a data portion including an entity identifier for the entity that requested to perform the requested operation, the requested operation is authorized, and the response from the vehicle computer 110. The data block can further include a linking portion including a link to the data portion, and a link to the most recent previous block added to the blockchain ledger 150. Following addition of the data block to the blockchain ledger 150, the process 300 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   store an electronic ledger that specifies an authorized operation for an entity to perform for a vehicle;
   receive a request, including an entity identifier for an entity making the request, to perform a requested operation;
   query the electronic ledger to determine that the requested operation is the authorized operation; and
   actuate the vehicle based on the authorized operation;
   wherein the computer is in the vehicle;
   wherein the electronic ledger is a distributed electronic ledger shared between at least the computer and an entity computer remote from the vehicle and associated with the entity.

2. The system of claim 1, wherein actuating the vehicle includes operating the vehicle to a location of the entity.

3. The system of claim 1, wherein the instructions further include instructions to output a message to a user based on the entity identifier.

4. The system of claim 1, wherein the instructions further include instructions to initiate the request based on one of a location of the vehicle, data received from a device on a vehicle communications bus, or a timeframe.

5. The system of claim 1, wherein the instructions further include instructions to record in the electronic ledger a record that a response to the request by the entity included the authorization and actuation of the vehicle to perform the authorized operation.

6. The system of claim 1, wherein the instructions further include instructions to determine that the requested operation is not authorized based on one or more prior operations recorded in the electronic ledger for the entity.

7. The system of claim 1, wherein the instructions further include instructions to determine that the authorized operation is not authorized based on the requested operation not meeting one or more parameters stored in the electronic ledger.

8. The system of claim 1, further comprising a master device, wherein determining that the requested operation is the authorized operation comprises querying the master device storing the electronic ledger in addition to a vehicle computer and an entity computer.

9. The system of claim 1, further comprising a master device, wherein the instructions further include instructions to receive the authorized operation for the entity from the master device and store the authorized operation for the entity to the electronic ledger.

10. A method comprising:
    storing an electronic ledger that specifies an authorized operation for an entity to perform for a vehicle;
    receiving a request, including an entity identifier for an entity making the request, to perform a requested operation;
    querying the electronic ledger to determine that the requested operation is the authorized operation; and
    actuating the vehicle based on the authorized operation;
    wherein the computer is in the vehicle;
    wherein the electronic ledger is a distributed electronic ledger shared between at least the computer and an entity computer remote from the vehicle and associated with the entity.

11. The method of claim 10, wherein actuating the vehicle includes operating the vehicle to a location of the entity.

12. The method of claim 10, further comprising outputting a message to a user based on the entity identifier.

13. The method of claim 10, further comprising initiating the request based on one of a location of the vehicle, data received from a device on a vehicle communications bus, or a timeframe.

14. The method of claim 10, further comprising recording in the electronic ledger a record that a response to the request by the entity included the authorization and actuation of the vehicle to perform the authorized operation.

15. The method of claim 10, further comprising determining that the requested operation is not authorized based on one or more prior operations recorded in the electronic ledger for the entity.

16. The method of claim 10, further comprising determining that the authorized operation is not authorized based on the requested operation not meeting one or more parameters stored in the electronic ledger.

17. The system of claim 1, wherein the request specifies a number of tokens, and wherein the instructions further include instructions to determine the request is authorized based on the number of tokens being below a token threshold, the electronic ledger stores the token threshold.

18. The system of claim 17, wherein the instructions further include instructions to transfer the number of tokens after actuating the vehicle to perform the authorized operation.

19. The system of claim 8, wherein the master device is associated with an owner of the vehicle.

20. The system of claim 9, wherein the master device is associated with an owner of the vehicle.

* * * * *